US010699082B2

(12) United States Patent
Bhagat

(10) Patent No.: US 10,699,082 B2
(45) Date of Patent: *Jun. 30, 2020

(54) FOREIGN LANGUAGE TRANSLATION USING PRODUCT INFORMATION

(71) Applicant: Amazon Technologies, Inc., Seattle, WA (US)

(72) Inventor: Rahul H. Bhagat, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 488 days.

This patent is subject to a terminal disclaimer.

(21) Appl. No.: 15/620,101

(22) Filed: Jun. 12, 2017

(65) Prior Publication Data

US 2017/0277683 A1  Sep. 28, 2017

Related U.S. Application Data

(62) Division of application No. 13/413,041, filed on Mar. 6, 2012, now Pat. No. 9,684,653.

(51) Int. Cl.
*G06Q 30/00* (2012.01)
*G06F 40/58* (2020.01)
(Continued)

(52) U.S. Cl.
CPC .......... *G06F 40/58* (2020.01); *G06F 16/3337* (2019.01); *G06F 16/36* (2019.01);
(Continued)

(58) Field of Classification Search
CPC .......... G06Q 30/0601; G06Q 30/0641; G06Q 30/0631; G06F 17/289; G06F 16/36; G06F 16/3337
(Continued)

(56) References Cited

U.S. PATENT DOCUMENTS 7,225,199 B1  5/2007  Green et al.
7,933,765 B2  4/2011  Summerlin et al.
(Continued)

FOREIGN PATENT DOCUMENTS

CN  101443759  5/2009
CN  101714144  5/2010
(Continued)

OTHER PUBLICATIONS

The European Office Action dated Oct. 4, 2018 for European patent application No. 13757110.5, a counterpart foreign application of U.S. Pat. No. 9,684,653, 7 pages.
(Continued)

*Primary Examiner* — Robert M Pond
(74) *Attorney, Agent, or Firm* — Lee & Hayes, P.C.

(57) ABSTRACT

Product information may be utilized to create a translation dictionary. The translation dictionary may then be utilized to translate search queries from a foreign language to the primary language that is utilized to provide an online e-commerce marketplace. The translated search queries may then be utilized to perform a search of a product catalog maintained by the online e-commerce marketplace. The translation dictionary created with the product information might also be utilized to translate resources, such as Web site resources, to verify the translation of the resources, and to perform other functionality.

20 Claims, 10 Drawing Sheets

(51) Int. Cl.
G06Q 30/06 (2012.01)
G06F 16/33 (2019.01)
G06F 16/36 (2019.01)

(52) U.S. Cl.
CPC ..... *G06Q 30/0601* (2013.01); *G06Q 30/0631* (2013.01); *G06Q 30/0641* (2013.01)

(58) Field of Classification Search
USPC .................................................. 705/26, 27
See application file for complete search history.

(56) References Cited

U.S. PATENT DOCUMENTS

| 8,140,410 B2 | 3/2012 | Sugumaran |
| 2003/0149686 A1 | 8/2003 | Drissi et al. |
| 2006/0173886 A1 | 8/2006 | Moulinier et al. |
| 2007/0240778 A1 | 10/2007 | L'Bassi et al. |
| 2008/0133444 A1 | 6/2008 | Gao et al. |
| 2008/0189257 A1 | 8/2008 | Wiseman et al. |
| 2008/0235202 A1 | 9/2008 | Wang et al. |
| 2008/0262826 A1 | 10/2008 | Pacull |
| 2008/0275691 A1 | 11/2008 | Summerlin et al. |
| 2009/0125497 A1 | 5/2009 | Jiang et al. |
| 2009/0222437 A1 | 9/2009 | Niu et al. |
| 2009/0259619 A1 | 10/2009 | Hsieh |
| 2010/0070262 A1 | 3/2010 | Udupa et al. |
| 2012/0330990 A1 | 12/2012 | Chen et al. |

FOREIGN PATENT DOCUMENTS

| CN | 102770859 | 11/2012 |
| EP | 2143997 | 1/2010 |
| JP | 2011209987 A | 10/2011 |
| WO | WO2007133625 | 11/2007 |
| WO | WO2009145614 | 12/2009 |

OTHER PUBLICATIONS

The Summons to Attend Oral Proceedings mailed on Feb. 21, 2019, for European Application No. 13757110.5, a counterpart foreign application of the U.S. Appl. No. 13/413,041, 9 pages.
The Summons to Attened Oral Proceedings mailed on Feb. 21, 2019, for European Application No. 13757110.5, a counterpart foreign application of the U.S. Appl. No. 13/413,041, 9 pages.
The Indian Office Action dated Apr. 30, 2019 for Indian Patent Application No. 6742/DELNP/2014, a counterpart of U.S. Pat. No. 9,684,653, 5 pages.
The Canadian Office Action dated Feb. 20, 2018 for Canadian Patent Application No. 2866261, a counterpart foreign application of U.S. Pat. No. 9,684,653, 4 pages.
The Canadian Office Action dated Feb. 21, 2019 for Canadian Patent Application No. 2866261, a counterpart foreign application of U.S. Pat. No. 9,684,653, 4 pages.
Berger, A. "The Candide System for Machine Translation" Proceedings of the 1994 ARPA Workshop on Human Language Technology, 1994, pp. 1-6, [online][retrieved on Mar. 6, 2012] retrieved from: www.cs.cmu.edu/~aberger/ps/candida.ps.
Bhagat, "Learning Paraphrases from Text", ProQuest LLC, UMI No. 3368694, Aug. 2009, 271 pages.
The Canadian Office Action dated Nov. 16, 2015 for Canadian patent application No. 2866261, a counterpart foreign application of U.S. Appl. No. 13/413,041, 3 pages.
The Canadian Office Action dated Aug. 3, 2016 for Canadian patent application No. 2866261, a counterpart foreign application of U.S. Appl. No. 13/413,041, 5 pages.
Cai, et al., "Parallelisation of a Statistics Based Dictionary Generator", ICAPP '96, Second Conference on Algorithms & Architectures for Parallel Processing, Singapore, IEEE, 1996, pp. 209-216.
The Chinese Office Action dated Mar. 1, 2017 for Chinese Patent Application No. 201380012055.8, a counterpart foreign application of U.S. Appl. No. 13/413,041.
The Chinese Office Action dated Sep. 20, 2016 for Chinese Patent Application No. 201380012055.8, a counterpart foreign application of U.S. Appl. No. 13/413,041.
The Extended European Search Report dated Sep. 28, 2015 for European Patent Application No. 13757110.5, 9 pages.
Translated the Japanese Office Action dated Oct. 6, 2015 for Japanese Patent Application No. 2014-561046, a counterpart foreign application of U.S. Appl. No. 13/413,041, 11 pages.
Translated the Japanese Office Action dated Mar. 1, 2016 for Japanese Patent Application No. 2014-561046, a counterpart foreign application of U.S. Appl. No. 13/413,041, 4 pages.
Nagata, et al., "The latest developments in maching translation: (vol. 1) Introduction to statistical machine translation", Information Processing, vol. 49, No. 1, Information Processing Society of Japan, Jan. 15, 2008, pp. 89-95.
Office action for U.S. Appl. No. 13/413,041, dated Jan. 10, 2017, Bhagat, "Foreign Language Translation Using Product Information", 42 pages.
Office Action for U.S. Appl. No. 13/413,041, dated Feb. 10, 2015, Rahul H. Bhagat, "Foreign Language Translation Using Product Information", 22 pages.
Office action for U.S. Appl. No. 13/413,041, dated Jul. 11, 2016, Bhagat, "Foreign Language Translation Using Product Information", 32 pages.
Final Office Action for U.S. Appl. No. 13/413,041, dated Aug. 26, 2015, Rahul H. Bhagat, "Foreign Language Translation Using Product Information", 21 pages.
PCT Search Report and Written Opinion dated Jun. 6, 2013 for PCT Application No. PCT/US13/291,52, First Named Inventor: Rahul Bhagat et al.
Sadat, "Exploiting Comparable Corpora for Cross-Language Information Retrieval", PRICAI 2010, Trends in Artificial Intelligence, Springer-Verlag, Berlin Heidelberg, 2010, pp. 662-667.
Sjobergh, et al., "What Types of Translations Hide in Wikipedia?", Large-Scale Knowledge Resources, Construction and Application (Lecture Notes in Computer Science), Springer-Verlag Berlin Heidelberg, 2008, pp. 59-66.
Webpage: GIZA++: Training of statistical translation models, 1999, pp. 1-2, [online][retrieved on Mar. 6, 2012] retrieved from: http://www-i6.informatik.rwth-aachen.de/Colleagues/och/software/GIZA++.html.

US 10,699,082 B2

FOREIGN LANGUAGE TRANSLATION USING PRODUCT INFORMATION

CROSS-REFERENCE TO RELATED APPLICATION

This application is a divisional of, and claims priority to, commonly owned, U.S. patent application Ser. No. 13/413,041 filed Mar. 6, 2012, and entitled "FOREIGN LANGUAGE TRANSLATION USING PRODUCT INFORMATION," now U.S. Pat. No. 9,684,653, which is herein incorporated by reference in its entirety.

BACKGROUND

A merchant may provide an online e-commerce marketplace for the purchase of a variety of products by customers. The products might include physical products that are shipped directly to customers and/or digital products that customers download from the e-commerce marketplace. The merchant that operates the e-commerce marketplace and/or third-party sellers may make products available for sale on the marketplace. The third-party sellers may provide product information for the products they have for sale to a merchant system that provides the e-commerce marketplace. The product information is utilized to generate product listings for the products on the e-commerce marketplace.

The product information provided by sellers might include values for various attributes of a product, such as an identifier for a product, like a stock keeping unit ("SKU") number; a title or description of the product; technical specifications for the product; the purchase price; product availability, such as whether the product is "in stock"; shipping parameters and costs; the geographic region in which the product is available to customers; the locale of the seller's fulfillment center; and other types of product details. The product information may then be utilized to generate product listings in a product catalog. The product listings are made available through the online e-commerce marketplace for searching and browsing by customers wishing to purchase the corresponding products from the sellers.

Product information provided by online e-commerce marketplaces is typically presented in a human readable language that is appropriate for the locale of the marketplace. For example, an online e-commerce marketplace in the United States may provide product information in English, while an online e-commerce marketplace in Spain may present product information in Spanish. Regardless of the language that an e-commerce marketplace is presented in, it is not uncommon for an e-commerce marketplace to receive search queries expressed in languages other than the primary language of the marketplace (referred to herein as "foreign languages"). For instance, United States based e-commerce marketplaces presented in English may receive queries expressed in Spanish or other non-English languages.

Search queries received at an online e-commerce marketplace that are expressed using a foreign language may be utilized to search for products in a standard fashion. Because such search queries are expressed in a language other than the primary language of the marketplace, it is likely that searches performed using such search queries will not return meaningful search results. This can be confusing and/or frustrating for a customer of the marketplace, and may lead the customer to shop at another online e-commerce marketplace.

It is with respect to these and other considerations that the disclosure made herein is presented.

DETAILED DESCRIPTION

Figure 1:
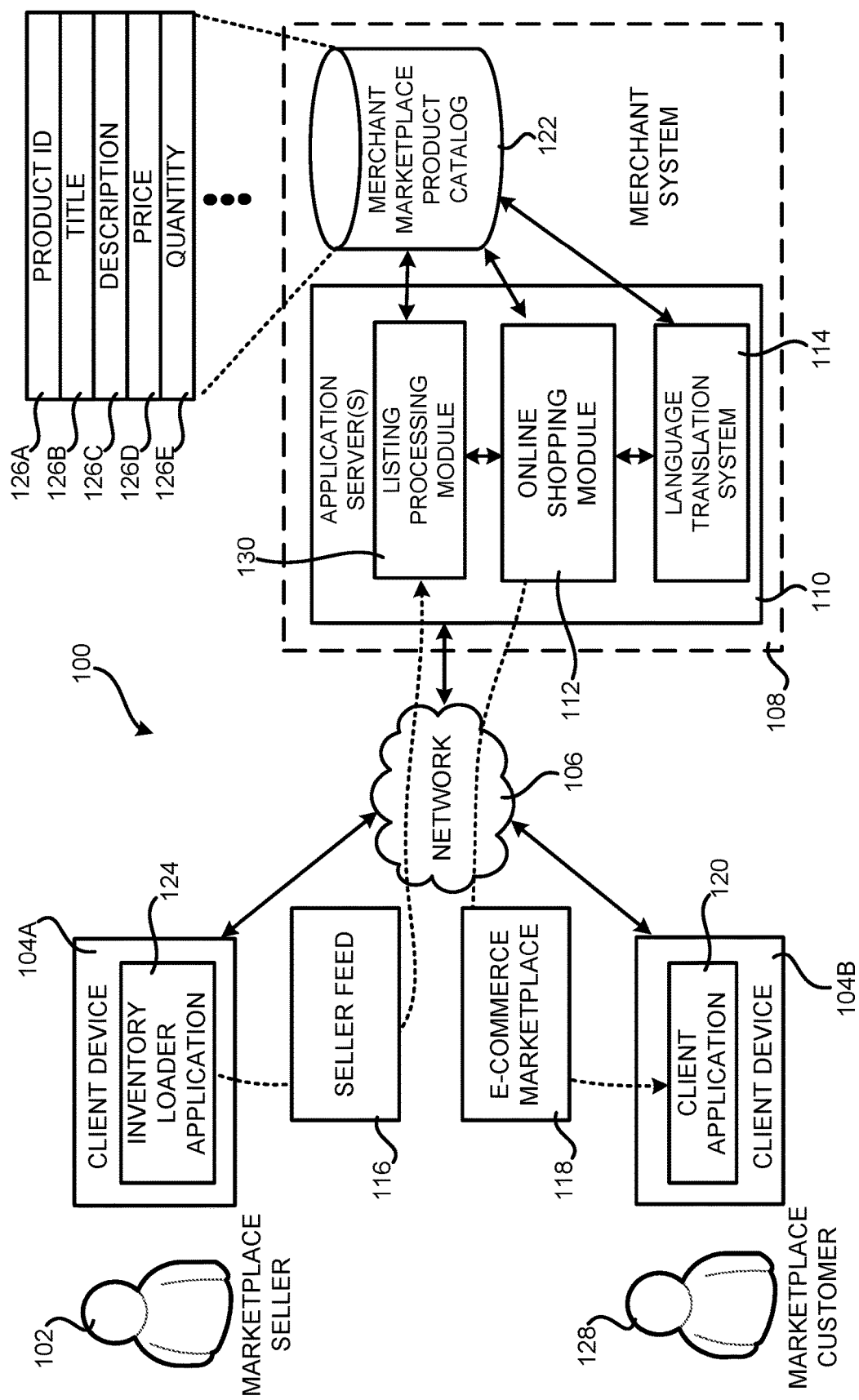
FIG. 1 is a system diagram showing an illustrative operating environment for the embodiments disclosed herein that includes a merchant system for providing an online e-commerce marketplace.

The following detailed description is directed to technologies for foreign language translation using product information. Through an implementation of the concepts and technologies disclosed herein, search queries received at an online e-commerce marketplace can be translated from a foreign language to the primary language utilized to provide the marketplace utilizing a dictionary created from product information. The translated search queries can then be utilized to search the marketplace, thereby likely providing better search results than if the foreign language search query had been processed without translation.

According to aspects presented herein, a merchant system is disclosed that is configured to execute an online shopping module that provides an e-commerce marketplace, such as a World Wide Web ("Web") site, for online shopping. The online shopping module is also configured to maintain and utilize a product catalog that stores product listings for products available for purchase through the e-commerce marketplace. The e-commerce marketplace provides functionality for browsing and searching for products in the product catalog, for purchasing the products, and for performing other functions.

According to embodiments, the merchant system is also configured to allow multiple sellers to sell products through the e-commerce marketplace. Sellers may provide product information to the merchant system that is utilized to generate product listings for the products offered for sale by the sellers. As mentioned above, the product information provided by a seller might include data for various attributes of a product, such as an identifier for a product; a title or description of the product; technical specifications for the product; the purchase price; data regarding product availability; shipping parameters and costs; the geographic region in which the product is available to customers; the locale of the seller's fulfillment center; and other types of product details. The product information may then be utilized to satisfy search queries and to generate product listings for the products in the product catalog.

According to one embodiment, the merchant system is also configured to permit sellers to provide product information in multiple human readable languages. For example, a seller might provide a description for a product in English and provide the same product description for the product in Spanish. The merchant system might store and utilize this information to provide localized versions of the online e-commerce marketplace in languages appropriate for a particular locale. For example, Spanish language product information might be utilized to provide a Spanish version of the online e-commerce marketplace to customers located in Spain and/or other Spanish speaking countries.

The merchant system is also configured in one embodiment to translate search queries expressed using human readable languages other than the primary language of the online e-commerce marketplace (referred to herein as "foreign" languages) to the primary language of an online marketplace. In order to perform this functionality, the merchant system is configured in one embodiment to generate a translation dictionary from product information that has been received in multiple languages. In particular, a statistical analysis may be performed on product information that has been provided in multiple languages in order to generate the translation dictionary.

According to one implementation, the translation dictionary includes the words found in the product information in one language (e.g. English). For each of the words in the first language, the translation dictionary also includes one or more words from the foreign language product information (e.g. Spanish), along with a corresponding probability that the word is a translation of the word in the first language. For example, the translation dictionary might include the English word "shoe." For the word "shoe", the translation dictionary might also include the Spanish words "zapato" and "herradura." For the words "zapato" and "herradura", the translation dictionary might indicate that the probability that the Spanish word "zapato" is a translation of the English word "shoe" is 85%, and that the probability that the Spanish word "herradura" is a translation of the English word "shoe" is 15%.

In one embodiment, the translation dictionary is created using product information from a variety of product categories. A translation dictionary created in this way can be utilized to translate search queries for products in different product categories. In another embodiment, separate translation dictionaries are created for each product category using product information from only a single product category. Searches for products within each category are then translated using the translation dictionary that was created using product information for products in the category.

Once the translation dictionary has been created, the dictionary may be utilized to translate search queries, such as product searches. In particular, when a search query is received at the merchant system, the merchant system first detects the language of the query. If the query is in a foreign language, the merchant system may utilize the translation dictionary to translate the search query to the primary language utilized by the online e-commerce marketplace provided by the merchant system. Once the search query has been translated, the translated search query can be utilized to search the product catalog of the online e-commerce marketplace in a standard fashion. The results of the search query may then be returned to the user that submitted the foreign language search query.

The translation dictionary might also be utilized to translate other information. For example, the translation dictionary might be utilized to translate resources provided or utilized by an online e-commerce marketplace. The term "resources" as utilized herein is intended to encompass any textual information expressed in a human readable language. For example, textual information provided as a part of a Web site provided by a merchant system ("Web site resources") may be translated utilizing the translation dictionary created in the manner described above. Web site resources may be translated in advance of receiving a request for the resources, or may be translated at the time a request for the resources is received.

In one embodiment, the online e-commerce marketplace is configured to display one or more "refinements" following the execution of a search query. Refinements are user interface controls that allow a user to refine the scope of the search query. For example, a user might search for the term "shoes" on the e-commerce marketplace. In response to such a search, the e-commerce marketplace might cause various search results to be displayed. The e-commerce marketplace might also display one or more refinements for refining the scope of the search query. For instance, the marketplace might show various sizes, widths, styles, or brands of shoes. If the user selects one of the refinements, the search results will be narrowed to only show those products satisfying the refined query.

In one embodiment, the translation dictionary can be utilized to translate refinements from the primary language of the e-commerce marketplace to another language. For instance, if the primary language of the e-commerce marketplace is English, the translation dictionary might be utilized to translate refinements provided by the e-commerce marketplace to Spanish or another foreign language. This may be performed, for instance, in response to receiving a search query in the foreign language. Other types of Web site resources provided by an online e-commerce marketplace might also be translated in a similar fashion.

According to other embodiments, the translation dictionary can also be utilized to verify the translation of resources, such as the refinements described above. In particular, in order to verify the translation of resources, the resources are first translated in the manner described above. The translated resources are then utilized to perform product searches at the e-commerce marketplace. The number of search results generated by the translated resources is then determined. The translated resources may then be approved or rejected based upon the number of search results. For instance, a translated resource that generates more than a threshold number of search results when used as a search query might be approved, while a translated resource that generates less than the threshold number of search results might be rejected. In this way, poor translations that generate few or no search results may be rejected. Additional aspects regarding the creation and use of the translation dictionary will be provided below with regard to FIGS. 1-10.

It should be appreciated that the embodiments disclosed herein might be utilized with any type of computer, computing system, device, Web site, application program, operating system, or other type of system or component. Accordingly, although the embodiments disclosed herein are primarily presented in the context of a merchant system that embodies the concepts disclosed herein for performing foreign language translation using product information, the disclosure presented herein is not limited to such an implementation.

It should also be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, tablet computers, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system diagram that shows an illustrative operating environment 100 including several hardware and software components for foreign language translation using product information, according to embodiments provided herein. The environment 100 is merely illustrative and the embodiments disclosed herein might be utilized in many different types of environments.

The environment 100 shown in FIG. 1 includes a merchant system 108 that provides an e-commerce marketplace 118 through which customers may browse, search, and purchase products. In one embodiment, the merchant system 108 includes a number of application servers 110 that provide various application services to sellers, such as the seller 102, and customers engaged in commerce through the e-commerce marketplace 118, such as the customer 128.

The application servers 110 may be implemented as standard server computers, database servers, Web servers, network appliances, desktop computers, other computing devices, and/or any combination thereof. The application servers 110 may execute a number of modules in order to provide the various services described herein. The modules may execute on a single application server 110 or in parallel across multiple application servers in the merchant system 108. In addition, each module may consist of a number of subcomponents executing on different application servers 110 or other computing devices in the merchant system 108. The modules may be implemented as software, hardware, or any combination of the two.

As shown in FIG. 1, a customer 128 may utilize a client device 104B to access the merchant system 108 through a network 106. The network 106 may be a local-area network ("LAN"), a wide-area network ("WAN"), the Internet, or any other networking topology known in the art that connects the client device 104B to the merchant system 108. Although only a single customer 128 has been illustrated in FIG. 1, it should be appreciated that many customers may simultaneously utilize the e-commerce marketplace 118.

The customer 128 may be an individual or entity that desires to browse, search, purchase, or has purchased, one or more products from the online merchant that operates the merchant system 108. The client device 104B may be a personal computer ("PC"), desktop workstation, laptop computer, tablet computer, notebook computer, personal digital assistant ("PDA"), electronic-book reader, game console, set-top box, consumer electronics device, server computer, or any other type of computing device capable of connecting to the network 106 and communicating with the merchant system 108. The customer 102 might also be referred to herein as a "user" or as a "visitor" to the e-commerce marketplace 118 provided by the merchant system 108.

The customer 128 may use a client application 120 executing on the client device 104B to access and utilize the online shopping services provided by the application servers 110. In one embodiment the client application 120 is a Web browser application, such as the MOZILLA® FIREFOX® Web browser from MOZILLA FOUNDATION of Mountain View, Calif. The client application 120 exchanges data with the application servers 110 in the merchant system 108 using the hypertext transfer protocol ("HTTP") or another appropriate protocol over the network 106. The client application 120 might also be a stand-alone client application configured for communicating with the application servers 110. The client application might also utilize any number of communication methods known in the art to communicate with the merchant system 108 and/or the application servers 110 across the network 106, including remote procedure calls, SOAP-based Web services, remote file access, proprietary client-server architectures, and the like.

According to one embodiment, the application servers 110 execute an online shopping module 112. The online shopping module 112 provides the e-commerce marketplace 118, including functionality for allowing the customer 128 to browse, search, and purchase products available from the online merchant that operates the merchant system 108 and from other sellers. For instance, the online shopping module 112 may retrieve a product listing for a particular product offered for sale by the online merchant or another seller from a product catalog 122, generate a Web page containing product information, and transmit the Web page over the network 106 to the client application 120 executing on the client device 104B for display to the customer 128.

The online shopping module 112 might utilize pre-stored or dynamically created resources to generate the e-commerce marketplace 118. For instance, Web pages, images, text files, program code for generating Web pages, metadata, scripts, executable code, and other types of data utilized to create and/or provide a Web page might be stored or dynamically generated. Other types of resources might also be stored or generated dynamically by the online shopping module 112 to provide the e-commerce marketplace 118. The online shopping module 112 might also maintain a customer profile data store including information about customers of the merchant system 108, such as their name, address and other contact information, payment information, preferences, and other data.

According to embodiments, the online shopping module 112 also provides functionality for allowing third-party sellers, such as the seller 102, to sell products on the e-commerce marketplace 118. Although only a single seller 102 is illustrated in FIG. 1, it should be appreciated that many such sellers might be permitted to sell products by way of the e-commerce marketplace 118.

In order to facilitate the listing of products for sale on the e-commerce marketplace 118 by sellers, the application servers 110 execute a listing processing module 130 in one embodiment. The listing processing module 130 receives a seller feed 116 from a seller 102 that contains product information describing the products the seller 102 wishes to make available for sale through the e-commerce marketplace 118.

The seller feed 116 may be a flat file containing tabular data, an extensible markup language ("XML") file, or any other data container in which product information can be encapsulated. The seller feed 116 may contain data for multiple product listings, each containing a number of fields identifying the product and describing various attributes of the product. The listing processing module 130 may receive the seller feed 116 from a client device 104A over the network 106.

In one embodiment, the seller feed 116 is produced by an inventory loader application 124 executing on the client device 104A. The inventor loader application 124 may be configured to integrate with an inventory management system (not shown) operated by the seller 102. It should be appreciated that other mechanisms might be provided to enable a seller 102 to list products for sale on the e-commerce marketplace 118. For example, the online shopping module 112 might provide a Web-based interface through which the seller 102 can create product listings by specifying product information for products offered for sale by the seller 102. Other mechanisms might also be utilized.

Based upon the product information received in the seller feed 116, the listing processing module 130 creates product listings in the product catalog 122. As illustrated in FIG. 1, each of the product listings might include a number of attributes 126 for storing the product information specified for the corresponding product. In the example shown in FIG. 1, for instance, a product listing has been created in the product catalog 122 that includes an attribute 126A for storing a product identifier, an attribute 126B for storing a product title, an attribute 126C for storing a product description, an attribute 126D for storing a price for the product, and an attribute 126E for storing an available quantity of the product. It should be appreciated that the attributes 126 shown in FIG. 1 are merely illustrative and that many more attributes might be specified in a product listing. It should also be appreciated that the attributes 126 for each product listing might vary. For example, the products in each product category might have different attributes 126.

As mentioned briefly above, the merchant system 108 might also be configured to permit a seller 102 to provide product information in multiple human readable languages. For example, the seller 102 might provide a description for a product in English and provide the same product description for the product in Spanish. The merchant system 108 might store this information in the product catalog 122 and utilize this information to provide localized versions of the e-commerce marketplace 118 in languages appropriate for a particular locale. For example, Spanish language product information might be utilized to provide a Spanish version of the e-commerce marketplace 118 to customers located in Spain and/or other Spanish speaking countries. It should be appreciated that product information might also be obtained from other sources in multiple languages, such as from a manufacturer of a product. Additional details regarding the provision of the e-commerce marketplace in multiple languages will be provided below with regard to FIG. 2.

The merchant system 108 is also configured in one embodiment to translate search queries expressed using human readable languages other than the primary language of the e-commerce marketplace 118 (referred to herein as "foreign" languages) to the primary language of the e-commerce marketplace 118. For instance, the primary language of the e-commerce marketplace 118 may be English. When search queries are received in a language other than English (e.g. Spanish), these search queries may be translated from Spanish to English and then performed in a standard fashion.

In various embodiments, foreign language search queries may be translated using a dictionary that is created from product information stored in the product catalog 122. In order to perform this functionality, the merchant system 108 is configured with a language translation system 114 that includes components for creating the translation dictionary, translating search queries, translating resources, such as Web site resources provided by the online shopping module 112, and for verifying the translation of resources. Details regarding the configuration and operation of the language translation system 114 will be provided below with regard to FIGS. 3-10.

Figure 2:
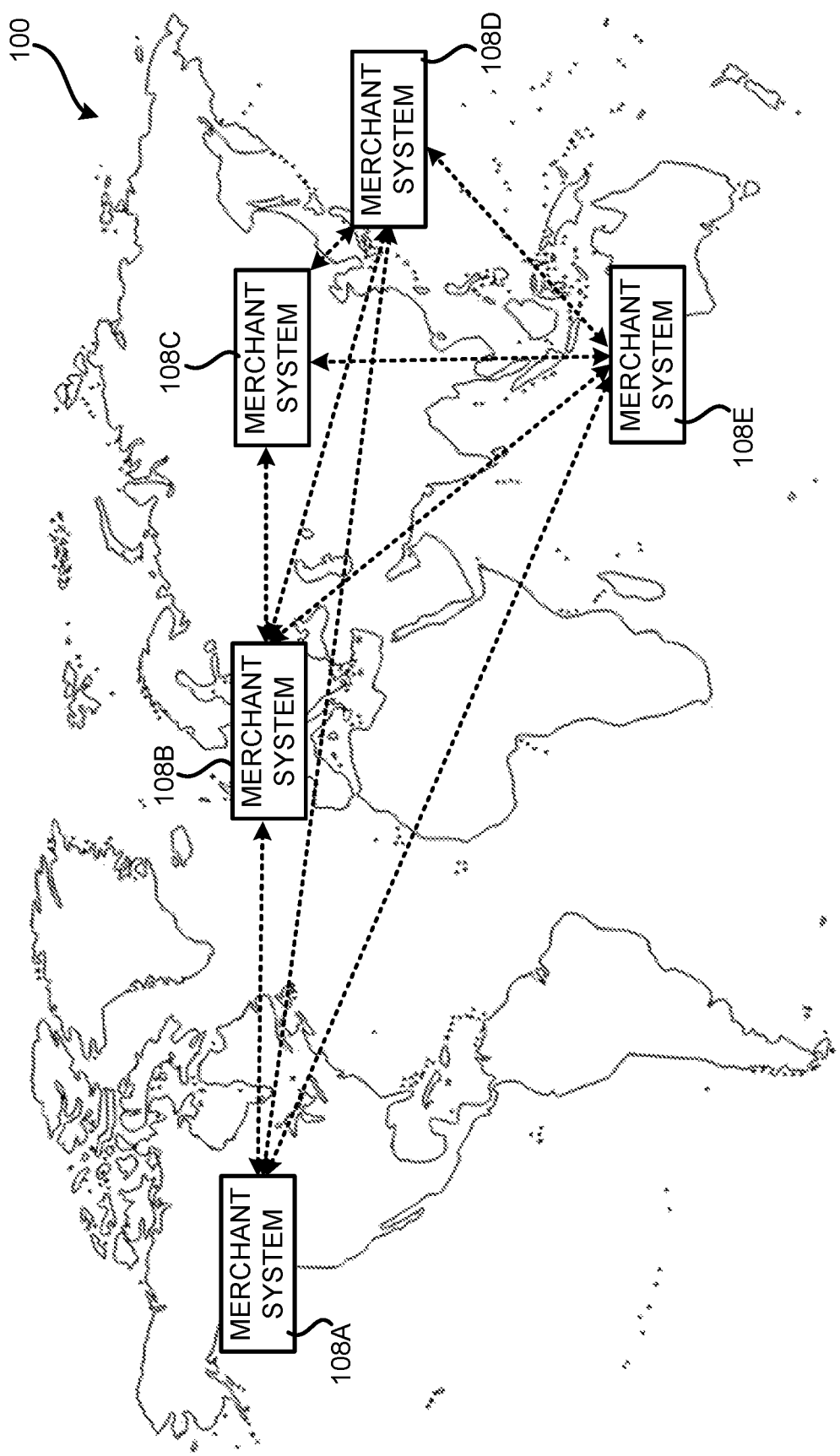
FIG. 2 is a system diagram showing additional aspects of one operating environment for the various embodiments disclosed herein.

FIG. 2 is a system diagram showing additional aspects of one operating environment for the various embodiments disclosed herein. In particular, FIG. 2 shows how various instances of the merchant system 108 might be geographically distributed in order to provide the e-commerce marketplace 118 to customers located around the world. For example, a merchant system 108A might be located in the United States in order to provide an English language version of the e-commerce marketplace to customers located in the U.S. Similarly, a merchant system 108B might be located in Europe to serve customers located in that region. Likewise, merchant systems 108C, 108D, and 108E might be located in China, Japan, and Australia, respectively, to serve customers located in those areas. The various merchant systems 108A-108E might be connected by appropriate WAN connections.

As mentioned briefly above, a seller 102 on the e-commerce marketplace 118 might upload product information to one of the merchant systems 108A-108E in multiple languages. For example, a seller 102 located in Europe might provide the same product information for a product to the merchant system 108B in various languages likely to be utilized by customers in Europe, such as English, French, German, and Spanish. This product information might then be stored by the merchant system 108B. This information might also be shared with the other merchant systems 108A and 108C-108E over the WAN described above.

The multi-lingual product information provided by sellers may be utilized to provide versions of the e-commerce marketplace 118 in various languages. For instance, product information provided in Spanish may be utilized to provide a Spanish language version of the e-commerce marketplace 118 to customers in Spain and other Spanish-speaking countries. Product information provided in other languages might be utilized to provide versions of the e-commerce marketplace 118 in languages appropriate for different geographic regions.

As discussed briefly above, it is not uncommon for an e-commerce marketplace 118 to receive search queries expressed in foreign languages. For instance, a United States based e-commerce marketplace 118 provided by the merchant system 108A and presented in English may receive queries expressed in Spanish or other non-English languages. Foreign language search queries may be utilized to search for products in a standard fashion. Because foreign language search queries are expressed in a language other than the primary language of the marketplace 118, however, it is likely that searches performed using such search queries will not return meaningful search results. This can be confusing and/or frustrating for a customer of the marketplace 118.

The language translation system 114 of the merchant system 108 provides functionality for translating foreign language queries to the primary language used by an e-commerce marketplace 118. The translated search queries can then be utilized to search the marketplace 118 in its native language, thereby likely providing better search results than if the foreign language search query had been processed without translation. Details regarding the structure of and functionality provided by the language translation system 114 will be provided below with respect to FIGS. 3-9.

Figure 3:
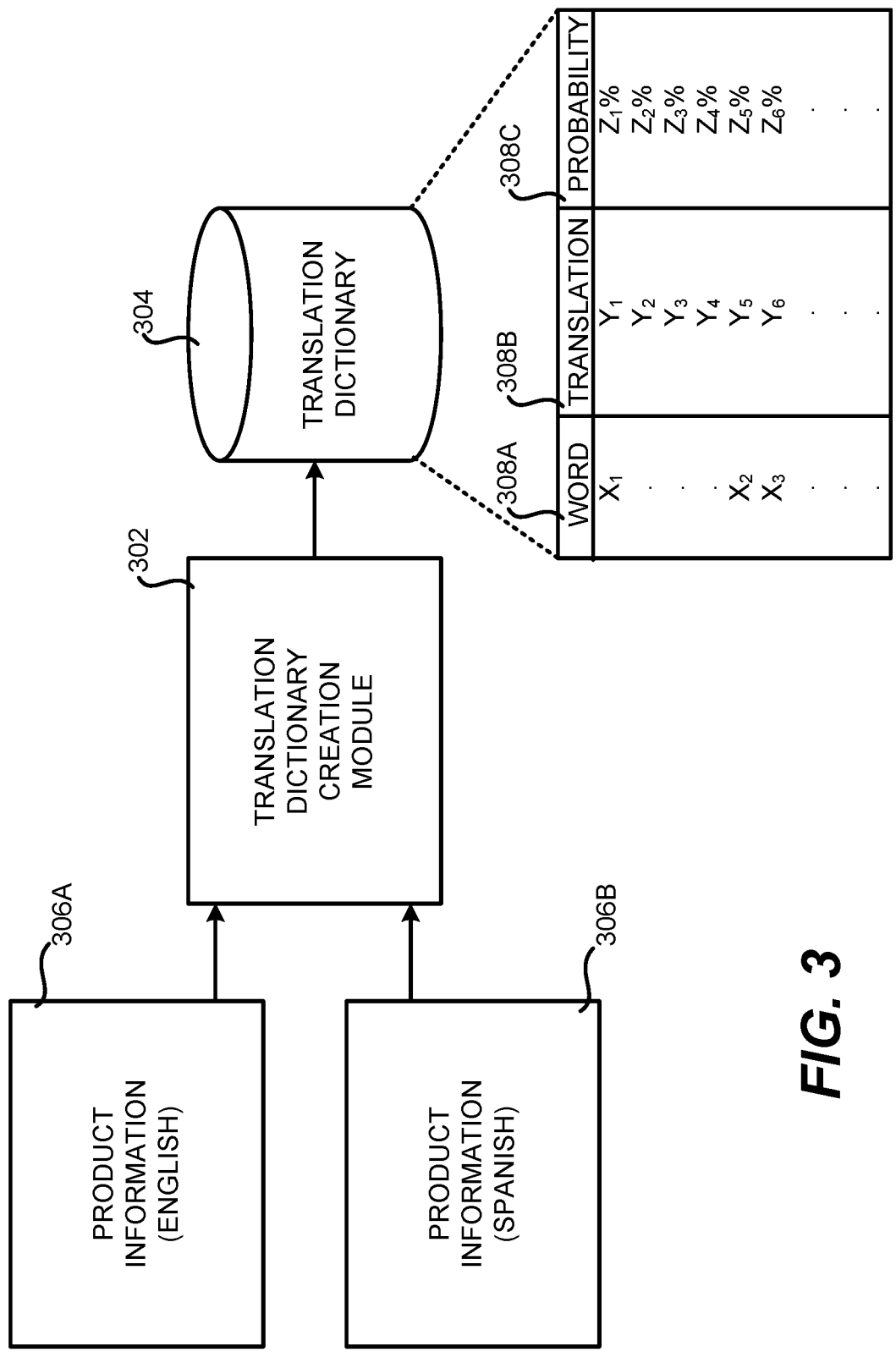
FIG. 3 is a software architecture diagram showing aspects of one mechanism for creating a translation dictionary using product information according to one embodiment disclosed herein.

FIG. 3 is a software architecture diagram showing aspects of one mechanism for creating a translation dictionary 304 using product information according to one embodiment disclosed herein. In particular, FIG. 3 shows aspects of the operation of a translation dictionary creation module 302, which forms a part of the language translation system 114 in one embodiment disclosed herein. The translation dictionary creation module 302 might be executed on the application servers 110 or upon another computer system.

The translation dictionary creation module 302 is configured to generate a translation dictionary 304 that can be utilized to translate human readable language. The translation dictionary creation module 302 creates the translation dictionary 304 using product information stored in the merchant marketplace product catalog 122. In the example shown in FIG. 3, the translation dictionary creation module 302 creates the translation dictionary 304 using product information 306A specified for a product in the English language and product information 306B specified for the same product in the Spanish language. When the translation dictionary 304 is created using English and Spanish product information, the translation dictionary 304 can be utilized to translate words from Spanish to English. When the translation dictionary 304 is created using product information expressed using other languages, the translation dictionary 304 may be utilized to translate words between the other languages. For example, the product information 306A and 306B might be utilized to create a translation dictionary 304 for translating from English to Spanish or another language.

The translation dictionary creation module 302 may create the translation dictionary 304 using product information from products in a variety of product categories. A translation dictionary 304 created in this way can be utilized to translate search queries for products in different product categories. In another embodiment, the translation dictionary creation module 302 creates separate translation dictionaries 304 for each product category. In this embodiment, a translation dictionary 304 for a product category is created using only product information from that product category. Searches for products within each category are then translated using the translation dictionary 304 that was created using product information for products in the category.

In order to create the translation dictionary 304, the translation dictionary creation module 302 performs a statistical analysis on the product information 306A and 306B that has been expressed in different languages. In particular, in one embodiment the translation dictionary creation module 302 iteratively applies an Expectation-Maximization ("EM") algorithm to determine the probability that words in the product information 306A are translations of words in the product information 306B. As known to those skilled in the art, the EM algorithm may be used for the unsupervised learning of bilingual translation dictionaries for statistical machine translation systems. The open source tools GIZA and GIZA++ are implementations of the EM algorithm that may be utilized in embodiments to create the translation dictionary 304. Other tools and/or components might be utilized to implement the EM algorithm in other embodiments. Other mechanisms might also be utilized to create the translation dictionary 304 from the bilingual product information 306.

As shown in FIG. 3, the translation dictionary 304 in one embodiment includes a field 308A that stores the words found in the product information 306A (i.e. the English product information in the example shown in FIG. 3). For each of the words in the product information 306A, the translation dictionary 304 also includes one or more words in a field 308B from the foreign language product information (i.e. the product information in Spanish in the example shown in FIG. 3).

For each of the words in the field 308B, the translation dictionary 304 also includes a corresponding probability in the field 308B that the word in the field 308B is a translation of the word in the field 308A. For example, the translation dictionary 304 might include the English word "shoe" in the column 308A. For the word "shoe", the field 308B might include the Spanish words "zapato" and "herradura." For the words "zapato" and "herradura", the field 308C might indicate that the probability that the Spanish word "zapato" is a translation of the English word "shoe" is 85%, and that the probability that the Spanish word "herradura" is a translation of the English word "shoe" is 15%. It should be appreciated that the structure illustrated in FIG. 3 is merely illustrative and that the data described above might be stored in different ways in other embodiments. Details regarding the use of the data stored in the translation dictionary 304 will be provided below with regard to FIGS. 4-9.

Figure 4:
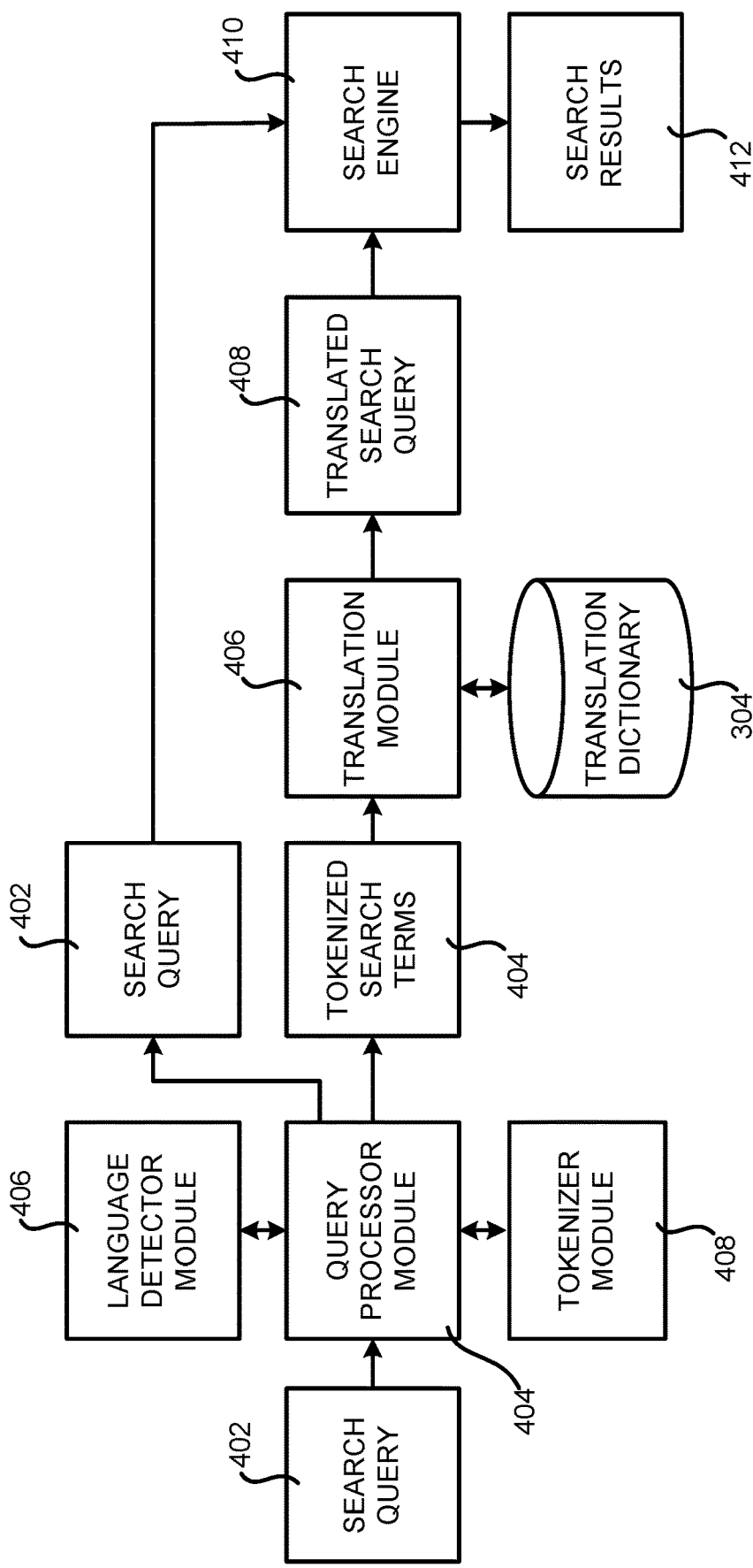
FIG. 4 is a software architecture diagram showing aspects of one mechanism presented herein for translating foreign language search queries according to one embodiment disclosed herein.

FIG. 4 is a software architecture diagram showing aspects of one mechanism presented herein for translating foreign language search queries using product information according to one embodiment disclosed herein. In particular, FIG. 4 illustrates aspects of the operation of a translation module 406 that forms a part of the language translation system 114 in one embodiment disclosed herein. The application servers 110 execute the translation module 406 in one embodiment.

Other computer systems might execute the translation module 406 in other implementations.

As illustrated in FIG. 4, a query processor module 404 executing within the merchant system 108 may be configured to receive a search query 402. The search query 402 is one or more search terms provided by a user desiring to search for products available through the e-commerce marketplace 118. The search query 402 may be specified in the primary language of the e-commerce marketplace 118 or in a foreign language.

In one embodiment, the query processor module 404 utilizes a language detector module 406 to determine the language of the search query 402. The language detector module 406 might also execute on the application servers 110 or on another computing system. If the search query 402 has been specified in the primary language of the e-commerce marketplace 118, the query processor module 404 provides the search query 402 directly to a search engine 410 without modification. The search engine 410 then performs a search of the product catalog 122 using the search query 402 and generates search results 412 thereby. The search results 412 may then be provided to the user that submitted the search query 402.

If the language detector module 406 determines that the search query 402 has been provided in a foreign language, the query processor module 404 might initiate a process for translating the search query 402 from the foreign language to the primary language of the e-commerce marketplace 118. In particular, in one embodiment, the query processor module 404 first utilizes a tokenizer module 408 to tokenize the search query 402. Tokenization refers to a process of breaking a stream of text into words, phrases, symbols, or other meaningful elements called tokens. Once the search query 402 has been separated into tokens, the tokenized search terms 404 are provided to the translation module 406.

The translation module 406 utilizes the translation dictionary 304, described above with regard to FIG. 3, to translate the tokenized search terms 404. In particular, for each of the tokenized search terms 404, the translation module 406 might identify the word in the field 308B having the highest probability specified in the field 308C. In this manner, a translated search query 408 is generated that includes the translations for each of the tokenized search terms 404.

Once the translated search query 408 has been generated, the translation module 406 submits the translated search query 408 to the search engine 410. The search engine 410 then performs a search of the product catalog 122 using the translated search query 408 and generates search results 412 thereby. The search results 412 may then be provided to the user that submitted the search query 402. In this way, a search query 402 submitted to the e-commerce marketplace 118 in a foreign language can be translated to the primary language of the marketplace 118 using the translation dictionary 304. Additional details regarding this process are provided below with regard to FIG. 5.

Figure 5:
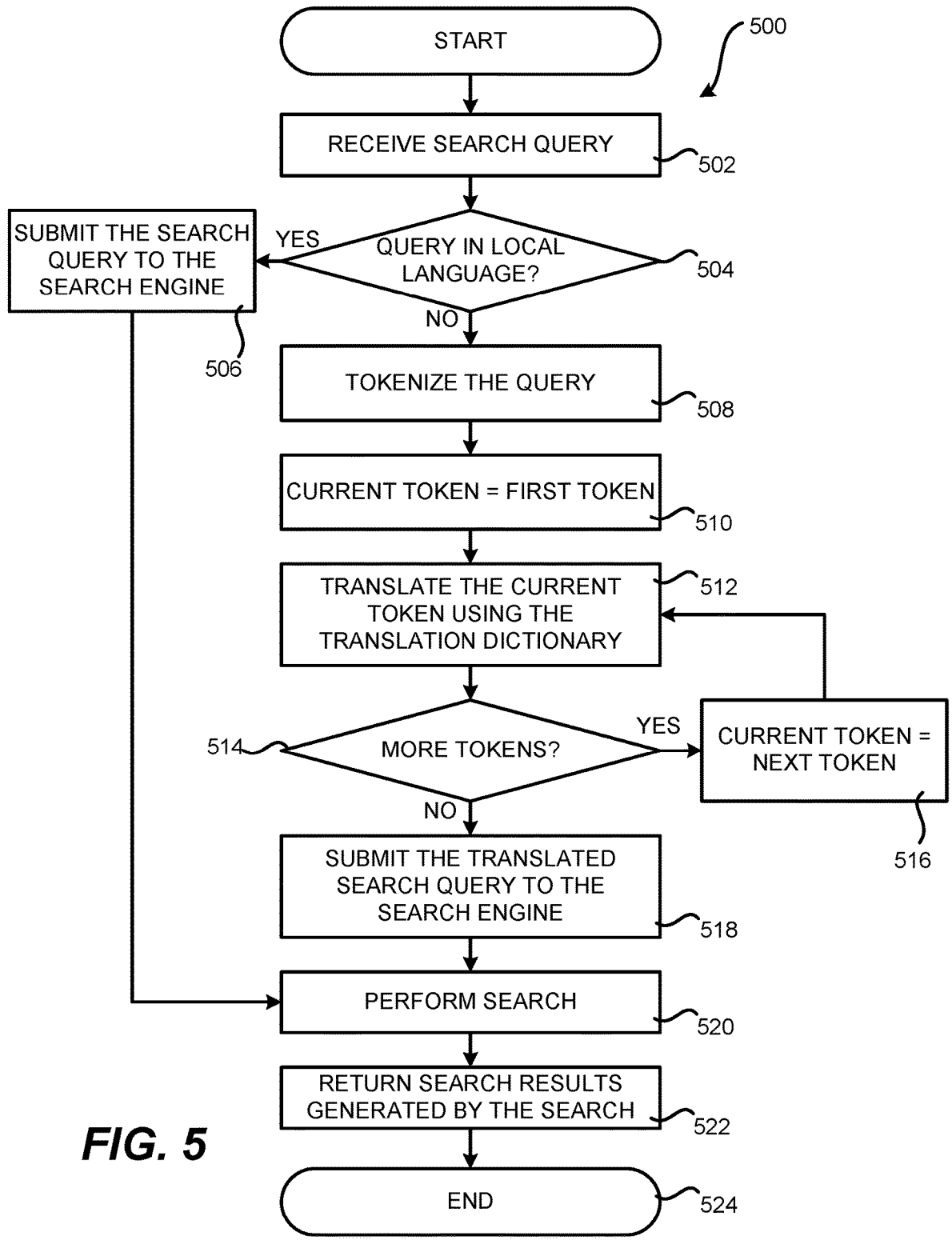
FIG. 5 is a flow diagram showing one illustrative routine for translating foreign language search queries, according to one embodiment disclosed herein.

Turning now to FIG. 5, additional details will be provided regarding the embodiments described herein for translating foreign language search queries using product information. It should be appreciated that the logical operations described herein with regard to FIG. 5, and the other FIGURES, are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein with reference to the various FIGURES are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 5 is a flow diagram showing one illustrative routine 500 for translating a foreign language search query, according to one embodiment disclosed herein. The routine 500 begins at operation 502, where the query processor module 404 receives a search query 402. The routine 500 then proceeds to operation 504, where a determination is made as to whether the search query 402 has been expressed in the primary language utilized by the e-commerce marketplace 118. As discussed above, a language detector module 406 might be utilized to determine the language of the search query 402.

If the search query 402 has been expressed in the primary language utilized by the e-commerce marketplace 118, the routine 500 proceeds from operation 504 to operation 506. At operation 506, the search query 402 is provided to the search engine 410 without modification. In this way, search queries provided to the query processor module 404 in the native language of the e-commerce marketplace 118 are not altered. The search engine 410 then processes the search query 402 at operation 520, and search results generated by the search query 402 are returned at operation 522.

If, at operation 504, the language detector module 406 determines that the search query 402 is not in the primary language utilized by the e-commerce marketplace 118, the routine 500 proceeds from operation 504 to operation 508. At operation 508, the tokenizer module 408 is utilized to tokenize the search query 402 in the manner described above. Once the tokenizer module 408 has generated the tokenized search terms 404, the routine 500 proceeds from operation 508 to operation 510.

At operation 510, a variable is initialized to keep track of the current tokenized search term that is being translated. Once the variable has been initialized, the routine 500 proceeds from operation 510 to operation 512, where the translation module translates the current token using the translation dictionary 304. As mentioned above, the translation module 304 might translate the current token by identifying the current token in the field 308B and then identifying the corresponding word in the field 308B having the highest probability specified in the field 308C. In this manner, the most likely translation of the current token is selected.

Once the current token has been translated, the routine 500 proceeds to operation 514, where the translation module 406 determines whether any additional tokens remain to be translated. If additional tokens remain to be translated, the routine 500 proceeds from operation 514 to operation 516, where the variable utilized to keep track of the current token is incremented to identify the next tokenized search term 404. The next token is then translated in the manner described above. This process repeats until all of the tokenized search terms 404 have been translated.

Once all of the tokenized search terms 404 have been translated, the routine 500 proceeds from operation 514 to operation 518. At operation 518, the translation module 406 submits the translated search query 408 to the search engine 410. The search engine 410 then processes the translated search query 408 at operation 520, and search results generated by the translated search query 408 are returned at operation 522. From operation 522, the routine 500 proceeds to operation 524, where it ends.

Figure 6:
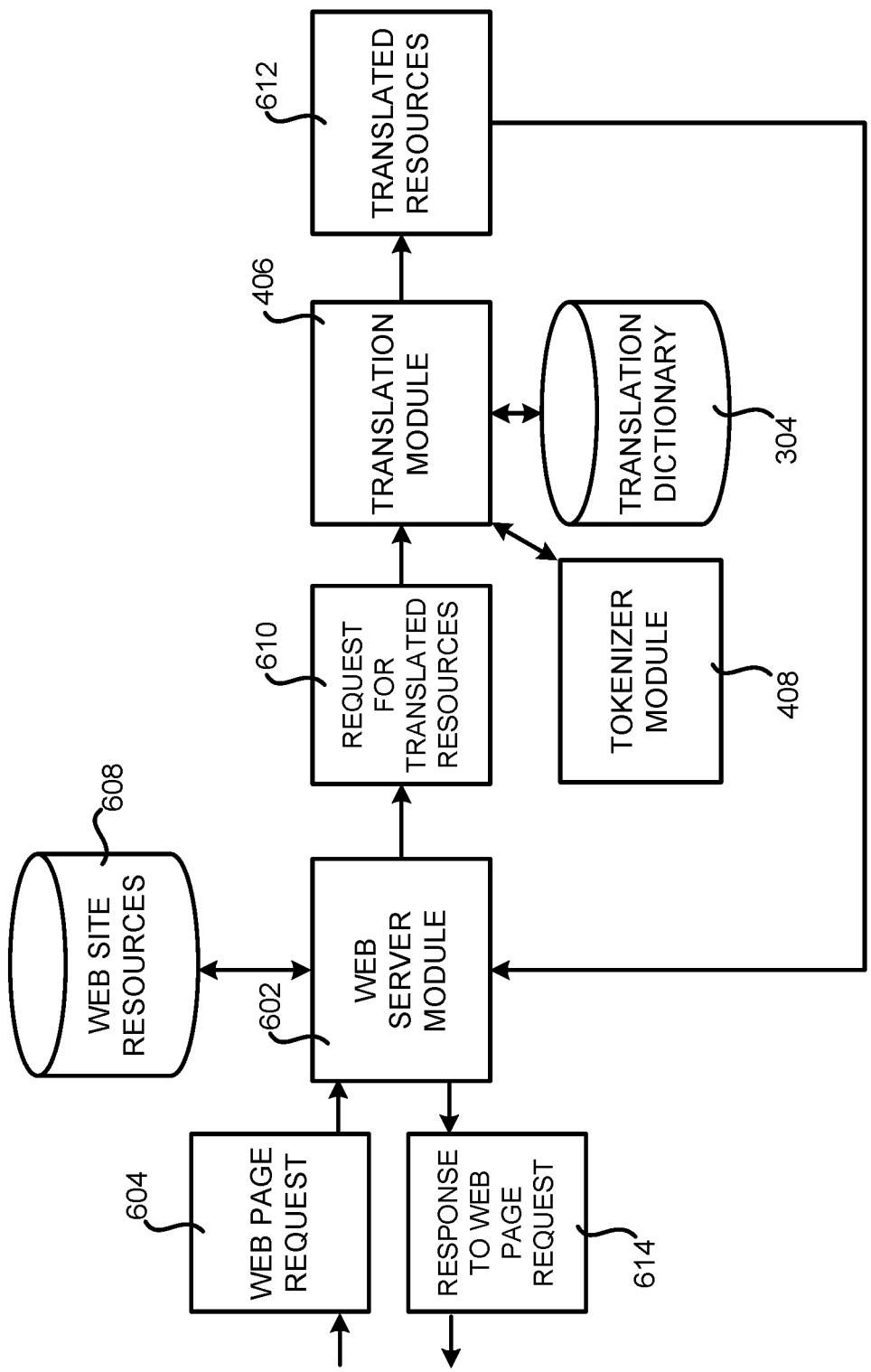
FIG. 6 is a software architecture diagram showing aspects of one mechanism presented herein for translating resources, such as Web site resources, according to one embodiment disclosed herein.

FIG. 6 is a software architecture diagram showing aspects of one mechanism presented herein for translating resources, such as Web site resources, according to one embodiment disclosed herein. As discussed briefly above, the translation dictionary 304 might also be utilized to translate other information. For example, the translation dictionary 304 might be utilized to translate resources provided or utilized by the e-commerce marketplace 118. The term "resources" as utilized herein is intended to encompass any textual information expressed in a human readable language. For example, textual information provided as a part of a Web site provided by the merchant system 108 ("Web site resources") may be translated utilizing the translation dictionary 304 created in the manner described above. Web site resources may be translated in advance of receiving a request for the resources at the merchant system 108, or may be translated at the time a request for the resources is received.

As also mentioned above, the e-commerce marketplace 118 may be configured to display one or more "refinements" following the execution of a search query. Refinements are user interface controls that allow a user to refine the scope of the search query. For example, a user might search for the term "shoes" on the e-commerce marketplace 118. In response to such a search, the e-commerce marketplace 118 might cause various search results to be displayed. The e-commerce marketplace 118 might also display one or more refinements for refining the scope of the search query. For instance, the marketplace 118 might show various sizes, widths, styles, or brands of shoes. If the user selects one of the refinements, the search results will be narrowed to only show those products satisfying the refined query.

Figure 7:
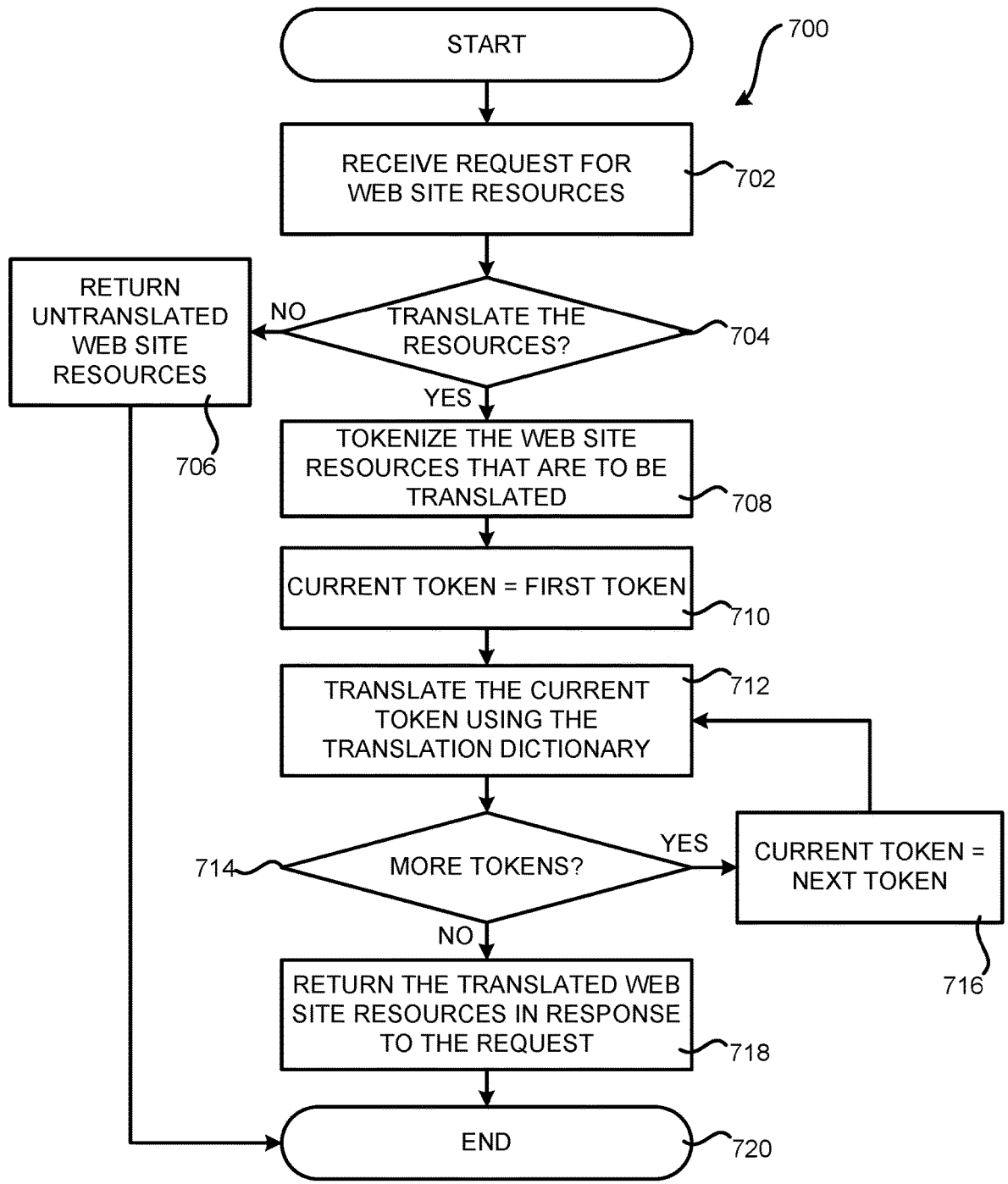
FIG. 7 is a flow diagram showing one illustrative routine for translating resources, such as Web site resources, according to one embodiment disclosed herein.

In one embodiment, the translation dictionary 304 can be utilized to translate refinements from the primary language of the e-commerce marketplace 118 to a foreign language. For instance, if the primary language of the e-commerce marketplace 118 is English, the translation dictionary 304 might be utilized to translate refinements provided by the e-commerce marketplace 118 to Spanish or another foreign language. This may be performed, for instance, in response to receiving a search query in the foreign language. Other types of Web site resources provided by the e-commerce 118 marketplace might also be translated in a similar fashion. FIGS. 6 and 7 illustrate additional aspects of this process in greater detail.

As shown in FIG. 6, the application servers 110 execute a Web server module 602 in one embodiment for providing the e-commerce marketplace 118 to client devices, such as the client device 104B. As known in the art, a Web server module 602 is a software application that is configured to receive and respond for requests for Web pages and other resources. The resources may be stored in the Web site resources database 608 or generated dynamically.

The Web server module 602 is configured to receive a Web page request 604 for a Web page of the e-commerce marketplace 118 that includes one or more resources, such as the refinements described above. In response to such a request, the Web server module 602, or another module, may determine whether the requested resources need to be translated. For instance, if the resources are requested following the receipt of a foreign language search query, the Web server module 602 might conclude that the requested resource, or resources, should be translated to the foreign language of the search query.

If the resources are to be translated, the Web server module 602 transmits a request 610 for translation to the translation module 406. The request 610 might include the resources to be translated, data indicating what language the resources are in, and data identifying the language that the resources should be translated to. In response to receiving the request 610, the translation module 406 tokenizes the resources using the tokenizer module 408 and translates the resources using the translation dictionary 304 in the manner described above.

Once the translation module 406 has translated the resources, the translation module 406 provides the translated resources 612 to the Web server module 602 in response to the request 610. The Web server module 602 may then generate a response 614 to the Web page request 604 that includes the translated resources. In this manner, resources can be translated dynamically in response to a request for the resources. It should be appreciated, however, that in other embodiments the resources might be translated in the manner described above and stored prior to receiving a request for the resources. Additional details regarding the process shown in FIG. 6 for translating resources will be provided below with regard to FIG. 7.

FIG. 7 is a flow diagram showing one illustrative routine 700 for translating resources, such as Web site resources, according to one embodiment disclosed herein. The routine 700 begins at operation 702, where the Web server module 602 receives a request for Web site resources, such as a Web page request 604. The routine 700 then proceeds to operation 704, where a determination is made as to whether the requested resources need to be translated. As discussed above, this determination might be made based upon whether a foreign language search query has been previously received or other factors.

If the requested resources do not need to be translated, the routine 700 proceeds from operation 704 to operation 706. At operation 706, the Web server module 602 retrieves or generates the requested resources and provides the resources in response to the request. The routine 700 then proceeds to operation 720, where it ends.

If, at operation 704, it is determined that the requested resources should be translated, the routine 700 proceeds from operation 704 to operation 708. At operation 708, the tokenizer module 408 may be utilized to tokenize the Web site resources that are to be translated in the manner described above. Once the tokenizer module 408 has tokenized the Web site resources, the routine 700 proceeds from operation 708 to operation 710.

At operation 710, a variable is initialized to keep track of the current tokenized resource that is being translated. Once the variable has been initialized, the routine 700 proceeds from operation 710 to operation 712, where the translation module 406 translates the current tokenized resource using the translation dictionary 304. As mentioned above, the translation module 304 might translate the current token by identifying the current token in the field 308B and then identifying the corresponding word in the field 308B having the highest probability specified in the field 308C. In this manner, the most likely translation of the current token is selected.

Once the current token has been translated, the routine 700 proceeds to operation 714, where the translation module 406 determines whether any additional tokens remain to be translated. If additional tokens remain to be translated, the routine 700 proceeds from operation 714 to operation 716, where the variable utilized to keep track of the current token is incremented to identify the next tokenized resource to be translated. The next token is then translated in the manner described above. This process repeats until all of the tokenized resources have been translated.

Once all of the requested resources have been translated, the routine 700 proceeds from operation 714 to operation 718. At operation 718, the Web server module 602 returns the translated resources in response to the original request. For instance, the Web server module 602 may provide a response 614 to the Web page request 604 that includes the translated resources. From operation 718, the routine 700 proceeds to operation 720, where it ends.

Figure 8:
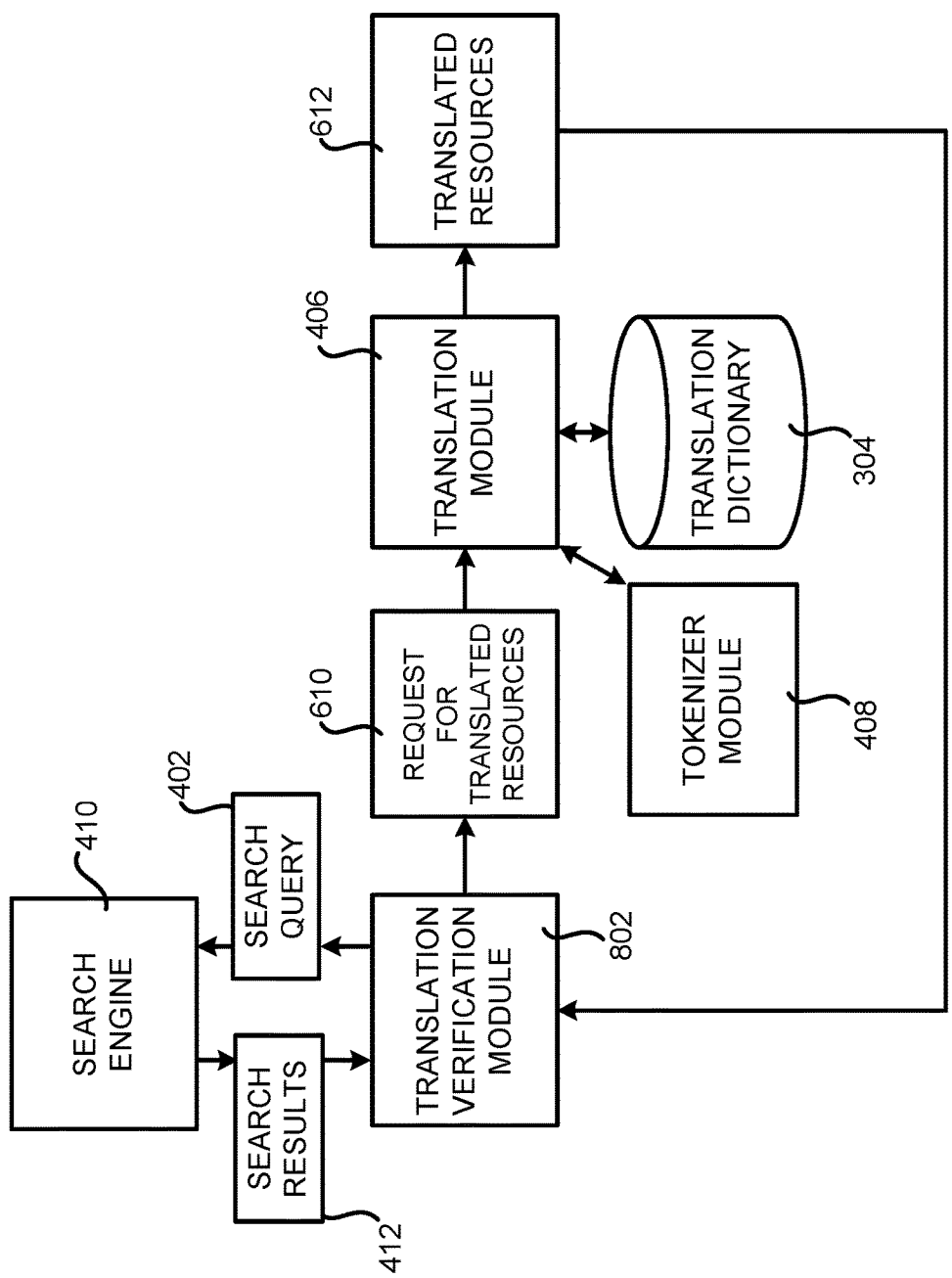
FIG. 8 is a software architecture diagram showing one illustrative mechanism for verifying the translation of resources, such as Web site resources, according to one embodiment disclosed herein.

FIG. 8 is a software architecture diagram showing one illustrative mechanism for verifying the translation of resources, such as Web site resources, according to one embodiment disclosed herein. As discussed briefly above, the translation dictionary 304 may be utilized in one embodiment to verify the translation of resources, such as the refinements described above. FIG. 8 illustrates aspects of the operation of a translation verification module 802 that is configured to verify the translation of resources. The translation verification module 802 forms a part of the language translation system 114 in one embodiment.

The translation verification module 802 is executed on the application servers 110 in one embodiment, but might be executed on other computing systems in other implementations. The translation verification module 802 is configured to verify the translation of resources, such as the Web site resources described above, by first causing the resources to be translated if they have not previously been translated. In order to translate the resources, the translation verification module 802 may transmit a request 610 for translation of the resources to the translation module 406. The translation module 406 may then utilize the tokenizer module 408 and the translation dictionary 304 to translate the resources in the manner described above. The translation module 406 then provides the translated resources 612 to the translation verification module 802 in response to the request 610.

Once the translation verification module 802 has the translated resources 612, the translation verification module 802 utilizes the translated resources 612 to perform product searches at the e-commerce marketplace. In particular, the translation verification module 802 may submit a search query 402 to the search engine 410 that includes the translated resources 612. The search engine 410 then performs a search of the product catalog 122 using the translated resources 612 and returns search results 412 to the translation verification module 802.

The translation verification module 802 then determines the number of search results 412 generated by the translated resources 612. The translation verification module 802 may then approve or reject the translated resources 612 based upon the number of returned search results 412. For instance, a translated resource 612 that generates more than a threshold number of search results 412 when used as a search query 402 might be approved, while a translated resource 612 that generates less than the threshold number of search results 412 might be rejected. In this way, the translation verification module 802 may reject translations that generate few or no search results. Additional details regarding this process are provided below with regard to FIG. 9.

Figure 9:
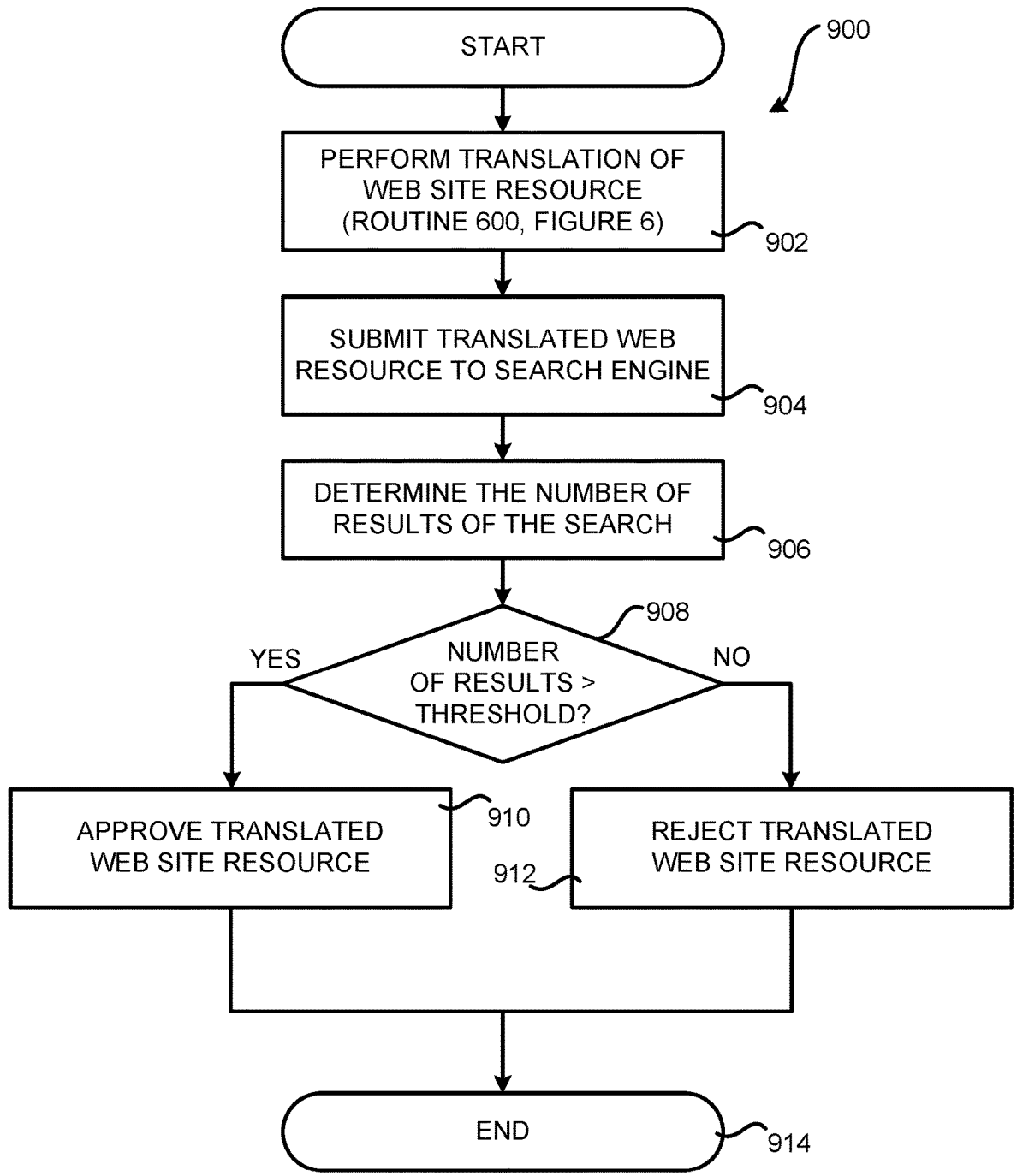
FIG. 9 is a flow diagram showing one illustrative routine for verifying the translation of resources, such as Web site resources, according to one embodiment disclosed herein.

FIG. 9 is a flow diagram showing one illustrative routine 900 for verifying the translation of resources, such as Web site resources, according to one embodiment disclosed herein. The routine 900 begins at operation 902, where the Web site resources to be verified are translated in the manner described above. Once the resources to be verified have been translated, the routine 900 proceeds to operation 902, where the translated resources 612 are submitted to the search engine 410 in the form of a search query 402 that includes the translated resources 612. The search engine 410 then performs a search of the product catalog 122 using the translated resources 612 and returns the results 412 of the search to the translation verification module 802.

From operation 904, the routine 900 proceeds to operation 906, where the translation verification module 802 determines the number of search results 412 generated by the search query 402. The routine 900 then proceeds to operation 908, where the translation verification module 802 determines whether the number of search results 412 exceeds a certain threshold. The threshold may be set by an owner or operator of the e-commerce marketplace.

If the number of search results 412 exceeds the threshold, the routine 900 proceeds from operation 908 to operation 910, where the translated resources 912 are approved. If the number of search results 412 does not exceed the threshold, the routine 900 proceeds from operation 908 to operation 912, where the translated resources 612 are rejected and may not be provided in response to requests for translations. From operations 910 and 912, the routine 900 proceeds to operation 914, where it ends.

Figure 10:
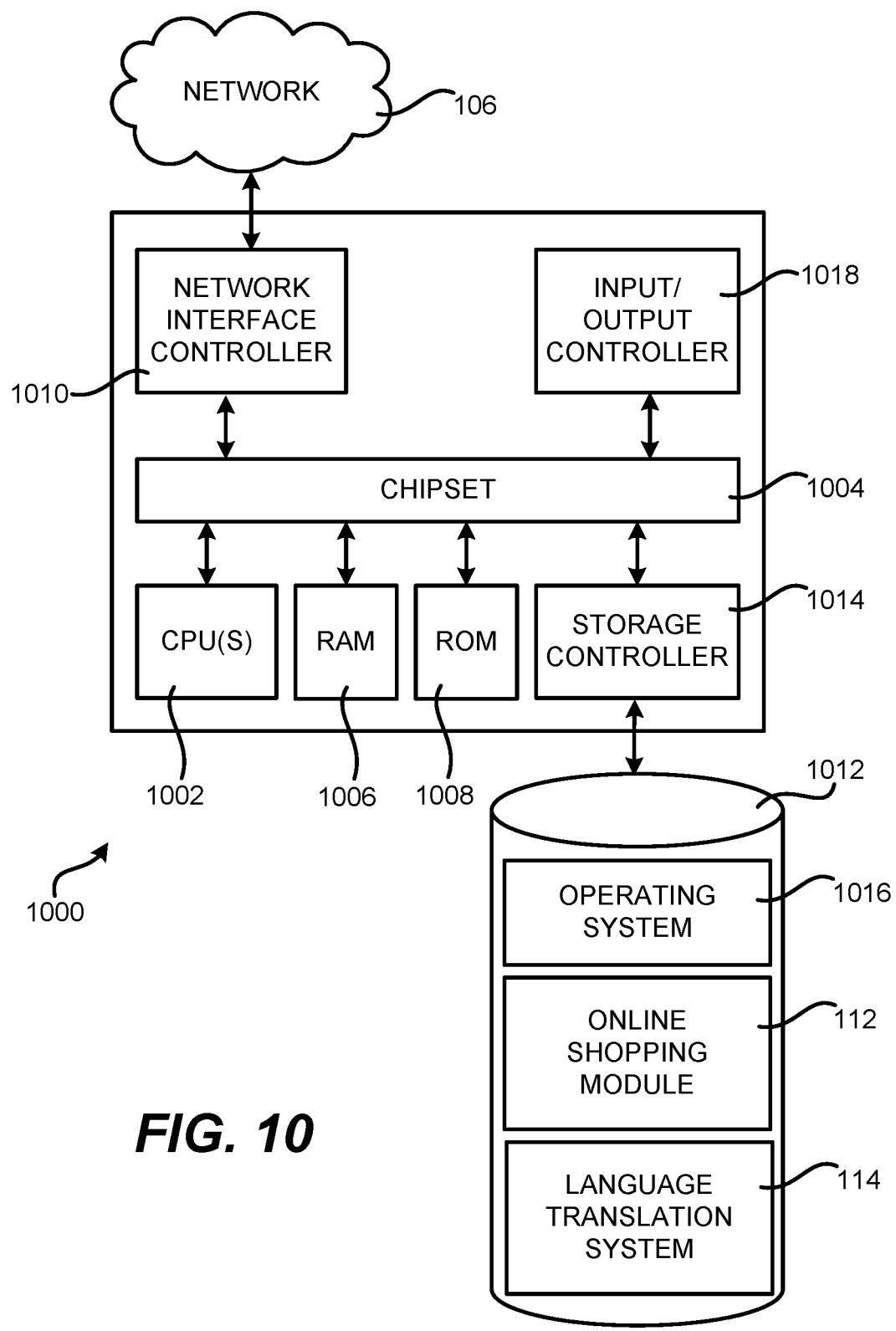
FIG. 10 is a computer architecture diagram showing one illustrative computer hardware architecture for use in computing devices configured to implement the concepts and technologies disclosed herein in one embodiment.

FIG. 10 shows an example computer architecture for a computer 1000 capable of executing the software components described herein for foreign language translation. The computer architecture 1000 shown in FIG. 10 illustrates a conventional server computer, workstation, desktop computer, laptop, PDA, electronic book reader, digital wireless phone, tablet computer, network appliance, set-top box, or other computing device, and may be utilized to execute any aspects of the software components presented herein described as executing on the merchant system 108, the client devices 104A-104B, or on other computing platforms.

The computer 1000 includes a baseboard, or "motherboard," which is a printed circuit board to which a multitude of components or devices may be connected by way of a system bus or other electrical communication paths. In one illustrative embodiment, one or more central processing units ("CPUs") 1002 operate in conjunction with a chipset 1004. The CPUs 1002 are standard programmable processors that perform arithmetic and logical operations necessary for the operation of the computer 1000.

The CPUs 1002 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 1004 provides an interface between the CPUs 1002 and the remainder of the components and devices on the baseboard. The chipset 1004 may provide an interface to a random access memory ("RAM") 1006, used as the main memory in the computer 1000. The chipset 1004 may further provide an interface to a computer-readable storage medium such as a read-only memory ("ROM") 1008 or non-volatile RAM ("NVRAM") for storing basic routines that that help to startup the computer 1000 and to transfer information between the various components and devices. The ROM 1008 or NVRAM may also store other software components necessary for the operation of the computer 1000 in accordance with the embodiments described herein.

According to various embodiments, the computer 1000 may operate in a networked environment using logical connections to remote computing devices and computer systems through a network, such as a local-area network ("LAN"), a wide-area network ("WAN"), the Internet, or any other networking topology known in the art that connects the computer 1000 to remote computers. The chipset 1004 includes functionality for providing network connectivity through a network interface controller ("NIC") 1010, such as a gigabit Ethernet adapter.

For example, the NIC 1010 may be capable of connecting the computer 1000 to other computing devices, such as the application servers 110, the client devices 104A-104B, a data storage system in the merchant system 108, and the like, over the network 106 described above in regard to FIG. 1. It should be appreciated that multiple NICs 1010 may be present in the computer 1000, connecting the computer to other types of networks and remote computer systems.

The computer 1000 may be connected to a mass storage device 1012 that provides non-volatile storage for the computer. The mass storage device 1012 may store system programs, application programs, other program modules, and data, which have been described in greater detail herein. The mass storage device 1012 may be connected to the computer 1000 through a storage controller 1014 connected to the chipset 1004. The mass storage device 1012 may consist of one or more physical storage units. The storage controller 1014 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 1000 may store data on the mass storage device 1012 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1012 is characterized as primary or secondary storage, or the like.

For example, the computer 1000 may store information to the mass storage device 1012 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 may further read information from the mass storage device 1012 by detecting the physical states or characteristics of one or more particular locations within the physical storage units.

In addition to the mass storage device 1012 described above, the computer 1000 might have access to other computer-readable media to store and retrieve information, such as program modules, data structures, or other data. It should be appreciated by those skilled in the art that computer-readable media can be any available media that may be accessed by the computer 1000, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 1012 may store an operating system 1016 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 1012 may store other system or application programs and data utilized by the computer 1000. For instance, when utilized to implement the client device 104B, the mass storage device may store the client application 120. When utilized to implement one or more of the application servers 110, the mass storage device may store the online shopping module 112, the listing processing module 130, and/or the various components of the language translation system 114 discussed above.

In one embodiment, the mass storage device 1012 or other computer-readable storage media may be encoded with computer-executable instructions that, when loaded into the computer 1000, transform the computer from a general-purpose computing system into a special-purpose computer capable of implementing the embodiments described herein. These computer-executable instructions transform the computer 1000 by specifying how the CPUs 1002 transition between states, as described above. According to one embodiment, the computer 1000 has access to computer-readable storage media storing computer-executable instructions that, when executed by the computer, perform the various routines and operations described herein.

The computer 1000 may also include an input/output controller 1018 for receiving and processing input from a number of input devices, such as a keyboard, a mouse, a touchpad, a touch screen, an electronic stylus, or other type of input device. Similarly, the input/output controller 1018 may provide output to a display device, such as a computer monitor, a flat-panel display, a digital projector, a printer, a plotter, or other type of output device. It will be appreciated that the computer 1000 may not include all of the components shown in FIG. 10, may include other components that are not explicitly shown in FIG. 10, or may utilize an architecture completely different than that shown in FIG. 10.

Based on the foregoing, it should be appreciated that technologies for foreign language translation using product information have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to:
   translate a resource of a plurality of resources in a resource category from a first human readable language to a second human readable language to generate a translated resource by using a translation dictionary,
   the translation dictionary being generated by performing a statistical analysis on resource information stored in a first human readable language for at least one resource of the plurality of resources and corresponding resource information stored in a second human readable language for the same at least one resource,
   the translation dictionary comprising a table having a plurality of columns, wherein
      a first column of the plurality of columns has a plurality of rows, each row in the first column containing a term of the resource information in the first human readable language,
      a second column of the plurality of columns has a corresponding plurality of rows, each row in the second column containing a term of the resource information in the second human readable language, and
      a third column of the plurality of columns has a corresponding plurality of rows, each row in the third column containing a probability that the term in the row in the second column is a translation of the term in the row of the first column,
   wherein a translation with the highest probability is used to translate the resource if a search term expressed in the second human readable language has more than one translation into the first human readable language;
   verify the translation of the resource by performing searches in the resource category using the translated resource, determining a number of search results generated by the searches, and approving the translation of the resource if the number is at least a threshold number of search results;
   receive, from a client device over a network, a request for translation of the resource; and
   provide, to the client device over the network for display by the client device, the translated resource.

2. The non-transitory computer-readable storage medium of claim 1, wherein the translation of the resource occurs before the request from the client device.

3. The non-transitory computer-readable storage medium of claim 1, wherein the translation of the resource occurs in response to the request from the client device.

4. The non-transitory computer-readable storage medium of claim 1, wherein the resources comprise Web site resources.

5. The non-transitory computer-readable storage medium of claim 4, wherein an online e-commerce marketplace provides the Web site resources, and wherein the first human readable language is a primary language utilized by the online e-commerce marketplace.

6. The non-transitory computer-readable storage medium of claim 1, having further computer-executable instructions stored thereupon which, when executed by the computer, cause the computer to:
   receive, from the client device over the network, a search query comprising one or more search terms expressed in the second human readable language;
   translate the one or more search terms expressed in the second human readable language to the first human readable language using the translation dictionary to provide one or more search terms in the first language, wherein the translation with the highest probability is used if the search term expressed in the second language has more than one translation into the first language;
   cause a search to be performed using the one or more search terms in the first language; and
   provide, to the client device over the network, information associated with one or more search results of the search.

7. A computer-implemented method for translating a search query, the computer-implemented method comprising executing instructions in a computer system to perform operations comprising:
   generating a translation dictionary by performing a statistical analysis on resource information stored in a first human readable language for at least one resource of a plurality of resources and corresponding resource information stored in a second human readable language for the same at least one resource, the translation dictionary comprising a table having a plurality of columns, wherein
      a first column of the plurality of columns has a plurality of rows, each row in the first column containing a term of the resource information in the first human readable language,
      a second column of the plurality of columns has a corresponding plurality of rows, each row in the second column containing a term of the resource information in the second human readable language, and
      a third column of the plurality of columns has a corresponding plurality of rows, each row in the third column containing a probability that the term in the row in the second column is a translation of the term in the row of the first column;
   translating a resource of a plurality of resources in a resource category from the first human readable language to the second human readable language to generate a translated resource by using the translation dictionary, wherein a translation with the highest probability is used to translate the resource if a search term expressed in the second human readable language has more than one translation into the first human readable language;
   verifying the translation of the resource by performing searches in the resource category using the translated resource, determining a number of search results generated by the searches, and approving the translation of the resource if the number is at least a threshold number of search results;

receiving, over a network, a request for translation of the resource; and providing, over the network, the translated resource.

8. The computer-implemented method of claim 7 wherein the translation of the resource occurs before the request for translation.

9. The computer-implemented method of claim 7, wherein the translation of the resource occurs in response to the request for translation.

10. The computer-implemented method of claim 7 and further comprising:

tokenizing the search query into one or more words in the second human readable language; and for each of the words in the second human readable language, identifying a translated work in the translation dictionary for the resource category in the first human readable language.

11. The computer-implemented method of claim 7 wherein an online e-commerce marketplace provides Web site resources, and wherein the first human readable language is a primary language utilized by the online e-commerce marketplace.

12. The computer-implemented method of claim 7 wherein the request is received from a client device and the translated resource is provided to the client device.

13. The computer-implemented method of claim 7 and further comprising:

receiving a search query comprising one or more search terms expressed in the second human readable language;

translating the one or more search terms expressed in the second human readable language to the first human readable language using the translation dictionary to provide one or more search terms in the first language, wherein the translation with the highest probability is used if the search term expressed in the second language has more than one translation into the first language;

causing a search to be performed using the one or more search terms in the first language; and providing, information associated with one or more search results of the search.

14. An apparatus to translate a search query, the apparatus comprising:

at least one processor; and a non-transitory computer-readable storage medium having computer-executable instructions stored thereon which, when executed on the at least one processor, cause the apparatus to:

generate a translation dictionary by performing a statistical analysis on resource information stored in a first human readable language for at least one resource of a plurality of resources and corresponding resource information stored in a second human readable language for the same at least one resource, the translation dictionary comprising a table having a plurality of columns, wherein a first column of the plurality of columns has a plurality of rows, each row in the first column containing a term of the resource information in the first human readable language, a second column of the plurality of columns has a corresponding plurality of rows, each row in the second column containing a term of the resource information in the second human readable language, and a third column of the plurality of columns has a corresponding plurality of rows, each row in the third column containing a probability that the term in the row in the second column is a translation of the term in the row of the first column;

translate a resource of a plurality of resources in a resource category from the first human readable language to the second human readable language to generate a translated resource by using the translation dictionary, wherein a translation with the highest probability is used to translate the resource if a search term expressed in the second human readable language has more than one translation into the first human readable language;

verify the translation of the resource by performing searches in the resource category using the translated resource, determining a number of search results generated by the searches, and approving the translation of the resource if the number is at least a threshold number of search results;

receive, over a network, a request for translation of the resource; and provide, over the network, the translated resource.

15. The apparatus of claim 14, wherein the non-transitory computer-readable storage medium has further computer-executable instructions stored thereon which, when executed on the at least one processor, cause the apparatus to translate the resource before receiving the request for translation.

16. The apparatus of claim 14, wherein the non-transitory computer-readable storage medium has further computer-executable instructions stored thereon which, when executed on the at least one processor, cause the apparatus to translate the resource in response to receiving the request for translation.

17. The apparatus of claim 14, wherein the non-transitory computer-readable storage medium has further computer-executable instructions stored thereon which, when executed on the at least one processor, cause the apparatus to:

translate one or more user interface controls from the second human readable language to the first human readable language using the translation dictionary, the one or more user interface controls configured to refine a scope of the search query.

18. The apparatus of claim 14 wherein an online e-commerce marketplace provides the Web site resources, and wherein the first human readable language is a primary language utilized by the online e-commerce marketplace.

19. The apparatus of claim 14, wherein the non-transitory computer-readable storage medium has further computer-executable instructions stored thereon which, when executed on the at least one processor, cause the apparatus to:

accept the request from a client device; and provide the translated resource to the client device.

20. The apparatus of claim 14, wherein the non-transitory computer-readable storage medium has further computer-executable instructions stored thereon which, when executed on the at least one processor, cause the apparatus to:

receive a search query comprising one or more search terms expressed in the second human readable language;

translate the one or more search terms expressed in the second human readable language to the first human readable language using the translation dictionary to provide one or more search terms in the first language, wherein the translation with the highest probability is used if the search term expressed in the second language has more than one translation into the first language;

cause a search to be performed using the one or more search terms in the first language; and provide information associated with one or more search results of the search.

* * * * *